Figure 2:
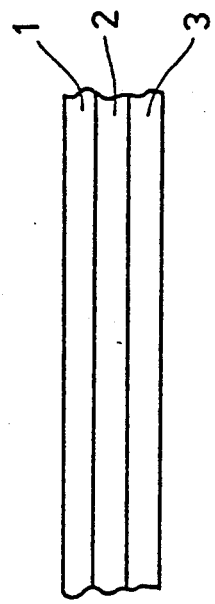

United States Patent [19]
McMurtrie et al.

[11] Patent Number: 5,322,720
[45] Date of Patent: Jun. 21, 1994

[54] MULTILAYER FILMS

[75] Inventors: Anthony W. McMurtrie, Palmerston North; Graham T. H. Bainbridge, Wellington, both of New Zealand

[73] Assignee: W. R. Grace and Co.-Conn., Duncan, S.C.

[21] Appl. No.: 10,508

[22] Filed: Jan. 28, 1993

Related U.S. Application Data

[63] Continuation of Ser. No. 438,373, Nov. 16, 1989, abandoned.

[30] Foreign Application Priority Data

Nov. 17, 1988 [NZ] New Zealand .................. 226983

[51] Int. Cl.⁵ ................... B32B 27/08; C08F 210/04
[52] U.S. Cl. ................... 428/34.9; 428/35.4; 428/36.7; 428/516; 428/518; 428/520; 428/913
[58] Field of Search ............. 428/516, 518, 520, 34.9, 428/35.4, 36.7, 913

[56] References Cited

U.S. PATENT DOCUMENTS

| | | | |
|---|---|---|---|
| 3,741,253 | 6/1973 | Brax et al. | 138/137 |
| 4,064,296 | 12/1977 | Bornstein et al. | 428/35 |
| 4,640,856 | 2/1987 | Ferguson et al. | 428/36 |
| 4,801,486 | 1/1989 | Quacquarella et al. | 428/34 |
| 4,863,769 | 9/1989 | Lustig et al. | 428/34 |
| 4,863,784 | 9/1989 | Lustig et al. | 428/216 |
| 4,927,708 | 4/1990 | Herran et al. | 428/332 |
| 4,976,898 | 12/1990 | Lustig et al. | 264/22 |

FOREIGN PATENT DOCUMENTS 0292894 11/1988 European Pat. Off. .

Primary Examiner—P. C. Sluby
Attorney, Agent, or Firm—William D. Lee, Jr.; Mark B. Quatt

[57] ABSTRACT

A multi-layer heat shrinkable film not confined to but including at least three layers, one outside layer being of a blend of EVA and VLDPE, the other outside layer being VLDPE or a blend of VLDPE and EVA and an internal layer being EVA or primarily EVA.

Such a multi-layer heat shrink film has good resistance of abuse. The film may include the optional barrier film and optionally two of the two contiguous co-extruded layers can be irradiated prior to the third or further layers. Such a precursor is then stretched into the film thickness required. The invention covers the method of treatment of such a film and a container or package including such a film.

12 Claims, 4 Drawing Sheets

MULTILAYER FILMS

This application is a continuation of application Ser. No. 438,373 filed on Nov. 16, 1989, now abandoned.

BACKGROUND OF THE INVENTION

The present invention relates to improvements in and/or relating to multi-layer heat shrinkable plastic films, containers (for example bags) or packages using same and to related means and methods.

Multi-layer heat shrinkable films have been used for some time for the shrink wrapping of various products including produce such as meats that will require refrigeration or freezing. Desirable characteristics in such films is their degree of shrinkage under moderate heat and their resistance to abuse (usually just penetration by the product).

Currently available in New Zealand are at least two films useful in the wrapping of produce such as meats. These include the Ionomer based materials employed in the SURLYN bags of Trigon Packaging Systems (NZ) Limited of Corner Avalon Drive and Foreman Road, Hamilton, New Zealand and the EVA (ethylene-vinyl acetate copolymer) based materials of W. R. Grace (NZ) Limited of Prosser Street, Elsdon, Porirua which are known as their SL3 and SB3 bags.

The abuse resistance of the films if improved would make such containers more useful in the packaging of produce having a greater tendency to penetrate or puncture the packaging. For example there is a high incidence of puncture where a bone is retained in a meat cut.

Also, it is essential for such films to be "high shrink" as these are important from both presentation appeal and consumer appeal points of view. A typical example of a "high shrink" EVA structure is the SL3 film of W. R. Grace (NZ) Limited with a minimum of 40 to 50% shrinkage when unrestrained.

The present invention therefore is directed to films, container, packages and methods of producing such films for example (by co-extrusion or coating extrusion) which will go at least someway to meet the above mentioned aim.

As used hereinafter the abbreviations EVA refers to an ethylene-vinyl acetate copolymer, VLDPE to very low density polyethylene polymer (preferably less than 0.915 gms/cc), PVdC to vinylidene chloride/vinyl chloride copolymer, and MA to vinylidene chloride methyl acrylate copolymer, used as a barrier layer to reduce the permeation of oxygen and other gases through the film thus reducing the deterioration of products contained in the film.

In a first aspect the present invention consists in a method of producing a multi-layer heat shrinkable film having a measure of abuse-resistance greater than that of EVA (ethylene-vinyl acetate copolymer) of a heat shrinkable quality and a shrinkability greater than that of VLDPE (very low density polyethylene polymer), or a precursor for such a film, comprising co-extruding as a multi-layer film precursor laminate, at least one layer of a high EVA content and at least one other layer each selected from the group comprising VLDPE, a blend substantially of VLDPE and a blend of VLDPE and EVA to provide the precursor, and subsequently treating the precursor to provide the heat shrinkable film.

Preferably said laminate is of two layers only.

Preferably said two layer combinations are selected from the group comprising VLDPE/EVA layers and VLDPE+EVA/EVA layers.

Preferably said EVA of said at least one layer of high EVA content has about a 19% by weight vinyl acetate (VA) content.

Preferably said EVA of said at least one other layer has about 12% by 10 weight vinyl acetate (VA) content.

Preferably said precursor laminate is irradiated to enhance its shrink and strength characteristics.

Preferably said irradiation is with a high energy electrons giving an absorbed irradiation dose of from 1 to 9 MegaRads.

Preferably said irradiation is with high energy electromagnetic radiation giving an absorbed dose of from 1 to 9 MegaRads.

Preferably the precursor laminate is then stretched by racking and/or blowing to a desired film thickness to thereby provide the heat shrinkable film.

Preferably the stretching is from 2 to 30 times the surface area of the film precursor.

Preferably the stretching is to about 10 times the surface area of the film precursor.

Preferably said method additionally comprises co-extruding onto the irradiated laminate at least one layer each selected from the group comprising EVA, VLDPE, and a blend thereof.

Preferably said one or more layers co-extruded onto the irradiated laminate is a blend of EVA and VLDPE.

Preferably said method comprises co-extruding onto the irradiated laminate at least one layer of VLDPE.

Preferably a barrier film to provide a better barrier to oxygen and other gases is co-extruded in conjunction with the at least one other layer being applied to the irradiated laminate.

Preferably said barrier layer is interposed between the irradiated laminate and at least one other layer co-extruded onto the irradiated laminate.

Preferably the precursor laminate for the multi-layer heat shrinkable film has a thickness of from 100 to 1000 microns.

Preferably the thickness is about 800 microns.

Preferably said precursor laminate produced by a method of the present invention previously defined is then stretched by racking and/or blowing to a desired film thickness to provide the heat shrinkable film.

Preferably said desired film thickness is in the range from about 50 to 150 microns.

Preferably the film thickness is in the range from 50 to 100 microns,

Preferably said film thickness is about 80 microns.

In a further aspect the present invention consists in a multi-layer heat shrinkable film having a measure of abuse-resistance greater than that of EVA of a heat shrinkable quality and a shrinkability and clarity greater than that of VLDPE when made by a method as previously defined or stretched from a precursor as previously defined.

Accordingly in another aspect the present invention consists in a multi-layer heat shrinkable film having good resistance to abuse, said film comprising at least three layers, one outside layer being VLDPE or a blend of EVA and VLDPE (hereinafter the "outside layer"), the other outside layer being VLDPE or a blend of VLDPE and EVA (hereinafter the "inside layer"), and an or the internal layer being EVA or primarily EVA.

Preferably the or an internal layer is EVA alone.

Preferably there is included at least one barrier layer.

Preferably said barrier layer is PVdC or MA.

Preferably said outside layer is a blend in the range of from 10 to 75% by weight EVA and from 90 to 25% by weight VLDPE.

Preferably the blend is in the range from 25 to 75% by weight EVA and from 75 to 25% by weight VLDPE.

In another preferred form the outside layer is VLDPE alone.

Preferably the inside layer is VLDPE alone. In other preferred formed however the inside layer is a blend of VLDPE and EVA.

Preferably the relative thicknesses of the layers are such that (ignoring any barrier layer) the inside layer is the thinnest.

Preferably there are four layers where the optional barrier layer is included.

Preferably said VLDPE has a density below 0.915 gms/cc.

Preferably said VLDPE has a density of between 0.912 and 0.905 gms/cc.

In a still further aspect the present invention consists in a multi-layer heat shrinkable film having good resistance to abuse, said film comprising at least three layers, there being an outside layer of a blend of from 10% to 75% by weight EVA and 90% to 25% by weight VLDPE, an inside layer (i.e. produce contacting) of VLDPE or a blend of VLDPE and EVA, at least one inside layer of EVA or primarily of EVA and an optional barrier layer (preferably of PVdC or MA).

Preferably the film as substantially as hereinafter described in detail.

In still a further aspect the invention consists in a container or packaging (or a package) wherein at least part thereof is a multi-layer heat shrinkable film in accordance with the present invention and wherein the outside layer (i.e. that layer not to contact the contents of any such container or package) being the blend of from 10 to 75% by weight EVA and 90 to 25% by weight VLDPE.

In yet a further aspect the invention consists a method of manufacture by extrusion which results in a multi-layer heat shrinkable film in accordance with the present invention.

In still a further aspect the present invention consists in a multi-layer heat shrinkable film having good resistance to abuse, said film stretched from a film precursor laminate comprising at lest three layers, there being (i) an outside layer of a blend of from 10% to 75% by weight EVA and 90% to 25% by weight VLDPE, (ii) an inside layer (i.e. produce contacting) of VLDPE or a blend of VLDPE and EVA, and (iii) at least one layer of EVA or primarily of EVA and an optional barrier layer sandwiched by said inside and outside layers.

Preferably said barrier layer is present and is of PVdC or MA.

Preferably said inside layer and a contiguous EVA layer forming part of the sandwiched layers (iii) has been irradiated while the remaining layers have not.

Figure 3:
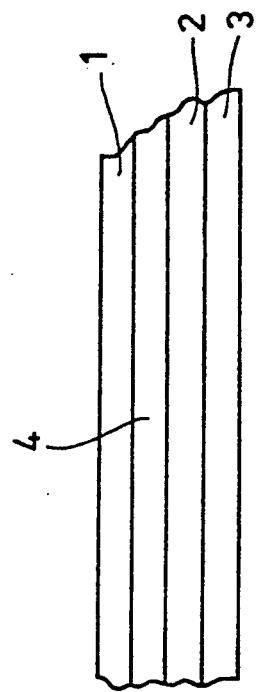
Figure 1:
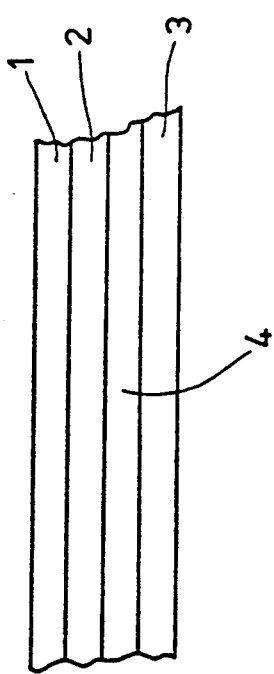
Figure 4:
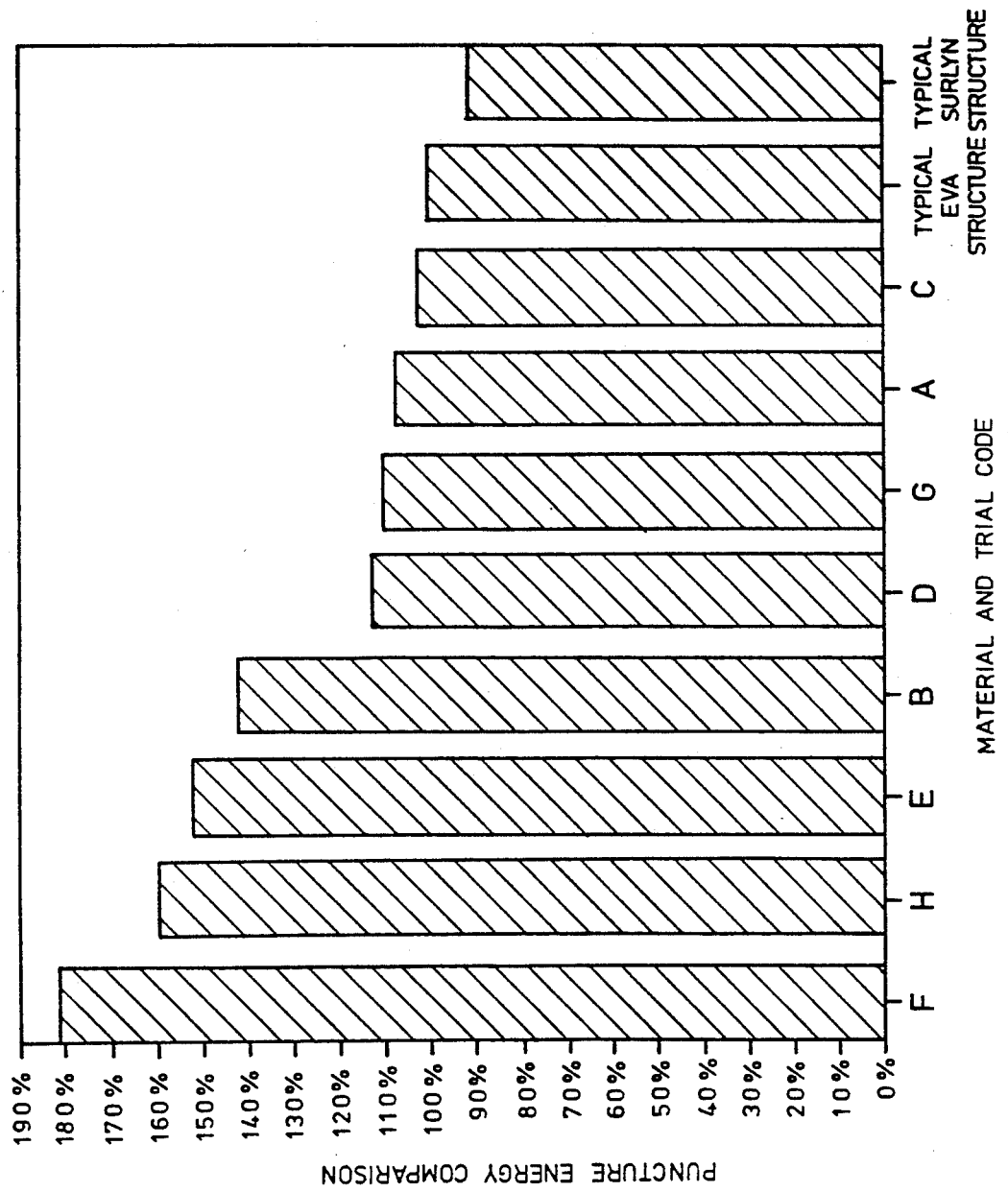
Figure 5:
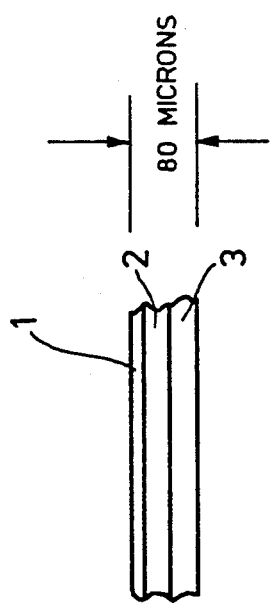
Figure 5:
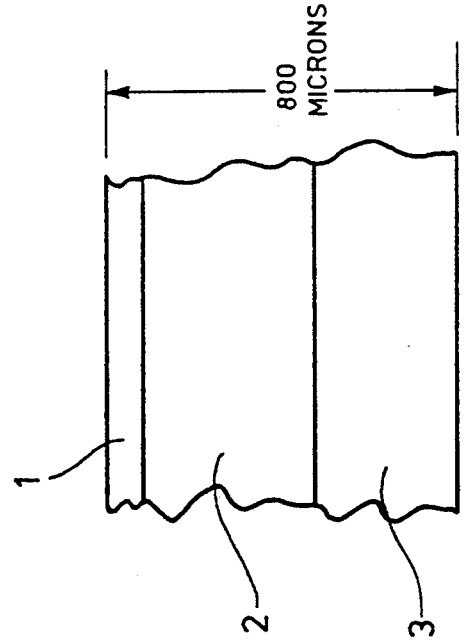
Figure 6:
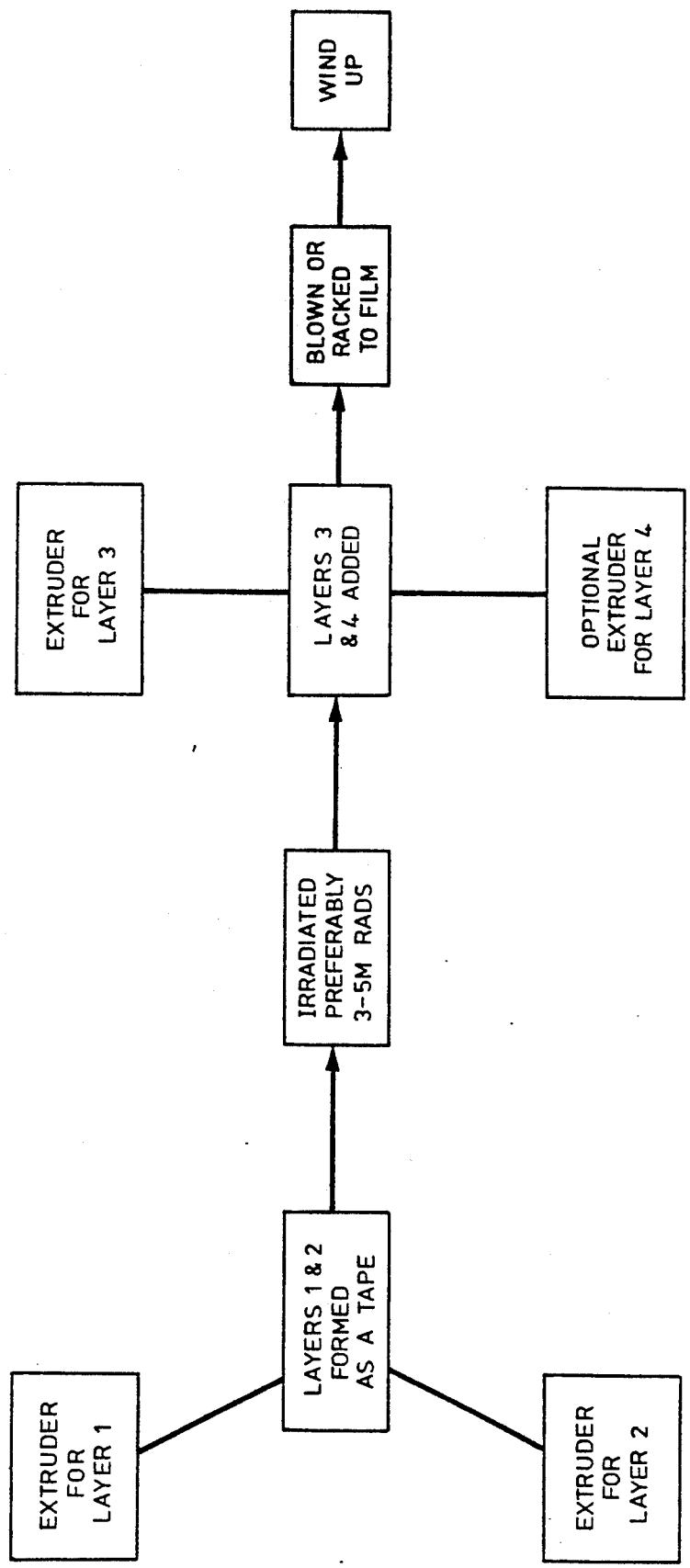

Preferred forms of the present invention will now be described with reference to the accompanying drawings in which FIG. 1 shows a four layer multi-layer heat shrinkable film such as can be produced by extrusion, for convenience all film thicknesses being shown substantially identical, FIG. 2 is a similar view of that to FIG. 1 but showing a three layer multi-layer film (i.e. without a barrier layer), FIG. 3 shows just one alternative to the four layer multi-layer film of FIG. 1., it being appreciated of course, that a number of layers well in excess of four can be employed if so desired, FIG. 4 is a graph of puncture energy comparisons for preferred films, FIG. 5 is a diagrammatic view of a preferred tape, for example, E or F of FIG. 4 showing how the tape is to be blown down to a film, and FIG. 6 is a preferred flow diagram for the manufacture of preferred film in accordance with the present invention showing the sequential laying up of the tape and its ultimate blowing, only layers 1 and 2 being irradiated in the preferred form.

In the preferred form of the present invention the layer 1 is preferably the so-called "inside layer" which in use (when the film was used as a wrapping, or to define a container or package) will be that surface likely to contact foodstuff. In each instance layer 3 is the "outside layer" which in use is not adapted to contact the produce. Layer 2 is that layer which is EVA alone or is primarily of EVA. Layer 4, where shown in FIGS. 1 and 3 only, is the optional barrier layer.

In the preferred form of the present invention the inside layer 1 is preferably EVA alone or a blend of EVA and VLDPE. Preferably the VLDPE has a MI of 0.5 to 3.5 and a density of from 0.900 to 0.915. A suitable VLDPE is that product available from the Dow Chemical Company under their trade name ATTANE.

The inside layer 1, however, can also be a blend of VLDPE and an EVA. Indeed, one preferred blend is a 50% mixture of an EVA by weight with VLDPE. Preferably the EVA has a MI of from 0.5 to 3.0, a density of from 0.92 to 0.956 and preferably a vinyl acetate content of from 9 to 30% by weight. A suitable VLDPE is that Dow resin known as ATTANE 4001 having a melt index (MI) of about 1.0 and a density of about 0.912 and ATTANE 4003 having a melt index (MI) of about 0.8 and a density of about 0.905. Preferably, when blended with an VLDPE the EVA resin is one having about 12% by weight vinyl acetate and a melt index (MI) of about 2.0 and a density of about 0.933.

Preferably the outside layer 3 is a blend of EVA and VLDPE in the range from 10 to 75% by weight EVA and 90 to 25% by weight VLDPE. Most preferred are those blends where the VLDPE is of a similar kind to that preferred for the inside layer and the EVA is that preferred for any blend of the inside layer.

The layer 2 is primarily of EVA and preferably is of EVA alone. Most preferred is an EVA having a higher vinyl acetate percentage by weight than that preferred for either the inside or outside layer blends. Preferably, the layer 2 is EVA having about 19% by weight vinyl acetate content.

Suitable EVAs for layers 1 and 3 are those available from EXXON CHEMICALS (NZ) LIMITED and known as ESCORENE 0.0212. A suitable EVA for layer 2 is that available from (EXXON CHEMICALS (NZ) LIMITED) and known as ESCORENE U.L. 0.0119.

The thickness or gauges of the various layers are preferably chosen as to provide an overall multi-layer film thickness that is desired. Preferably the overall film thickness is of the order of 50–100 microns. Preferably the inner layer is from about 5 to 15 microns, layer 2 from about 20 to 50 microns and outer layer of about 20 to 40 microns. Obviously, the overall multi-layer film may be thicker if the optional barrier layer is included but is likely to be the same thus resulting in other layers being towards the lower end of their thickness range.

To provide such thickness film a tape thickness (the film precursor or film prior to blowing) of the order of about 800 microns is just one of the many possibilities. An example of just such a tape (film precursor) is one having an inner layer of from 50 to 100 microns, a layer 2 of from 380 to 430 microns and an outer layer of about 320 microns. Such thicknesses are not critical.

Referring, therefore, to FIG. 5, it can be seen that the tape prepared by the process is blown by a known procedure e.g. as disclosed in NZ Patent Specification Nos. 209661, 211558 and 211688 down to a preferred film thickness of, for example, 80 microns from the tape thickness of 800 microns prior to blowing or racking. As previously stated, the overall film thickness or tape thickness is not critical, but ideally for food preparation purposes the overall film thickness is of the order of from 50 to 100 microns.

FIG. 6 shows the preferred flow diagram for the manufacture of laminate film in accordance with the present invention. FIG. 6 described a film such as that depicted in FIG. 5, which in the preferred form of the present invention, will be either F or H as depicted in Table 1.

In FIG. 6 it can be seen that layers 1 and 2 are formed as a tape from two separate extruders. That laminate is then irradiated in a known manner (see, for example, the aforesaid NZ Patent Specification Nos. 209661, 211558 and 211688) with high energy irradiation (electromagnetic or electrons) to enhance the shrink characteristics required. Preferably, irradiation is to give an absorbed irradiation of from 1 to 9 megaRads (preferably 3 to 5). Thereafter, layer 3 is added using an extruder. If desired, additional layers can be added at this stage e.g. the barrier layer to ensure the film is substantially impermeable to gas transmission (mainly oxygen). Thereafter, there is no further irradiation. The tape of the three or four layers is then blown or stretched to the film thickness required. Preferably the total stretch is from 2 to 30 times the film precursor dimension (preferably about 10). The final procedure is the wind up.

By way of example, included in table 1, for various formulations A to H are various non-barrier layer including multi-layer films, having a variety of different layer formulations and thicknesses but to show for a constant overall multi-layer tape precursor thickness (preferably 800 microns) the percentages by weight of the VLDPE. The preferred VLDPE is sourced from the Dow Chemical Company and is ATTANE 4001 (MI 1.0 and density 0.912), ATTANE 4002 (MI 3.3 and density 0.912) and ATTANE 4003 (MI 0.8 and density 0.905). The preferred EVA product preferably sourced from EXXON CHEMICALS (NZ) LIMITED is in the case of layer 2 preferably a 19% vinyl acetate EVA while the EVA included in the inner layer 1 of film E and the outer layers 3 of each of the films A to H is preferably a 12% vinyl acetate EVA.

Also included in Table I are various barrier film precursors numbered 1 to 3 which are essentially the non-barrier film precursor with an additional MA layer introduced between the outside layer and the main irradiated laminater.

TABLE I

| FILM PRECURSOR LAYER THICKNESSES (Microns) | | | | |
| --- | --- | --- | --- | --- |
| | A | B | C | D |
| INNER LAYER (1) | 100 ATTANE 4002 | 100 ATTANE 4002 | 100 ATTANE 4001 | 100 ATTANE 4001 |
| LAYER (2) (18% vinyl acetate EVA unless 28% stated) | 380 | 380 | 380 | 380 |
| OPTIONAL BARRIER* (4) | — | — | — | — |
| OUTER LAYER (3) The EVA is 12% vinyl acetate EVA | 320 25% ATTANE 4002 75% EVA | 320 50% ATTANE 4002 50% EVA | 320 25% ATTANE 4001 75% EVA | 320 50% ATTANE 4001 50% EVA |
| Total | 800 | 800 | 800 | 800 |
| % VLDPE BY WEIGHT | 22.18% | 32.1% | 22.18% | 32.1% |
| FILM THICKNESS | 78 | 80 | 77 | 74 |
| | E | F | G | H |
| INNER LAYER (1) | 100 50% ATTANE 4001 50% EVA (12% vinyl acetate) | 50 ATTANE 4001 | 100 ATTANE 4003 | 100 ATTANE 4003 |
| LAYER (2) (18% vinyl acetate EVA unless 28% stated) | 380 | 430 | 380 | 380 |
| OPTIONAL BARRIER* (4) | — | — | — | — |
| OUTER LAYER (3) The EVA is 12% vinyl acetate EVA | 320 50% ATTANE 4001 50% EVA | 320 75% ATTANE 4001 25% EVA | 320 25% ATTANE 4003 75% EVA | 320 50% ATTANE 4003 50% EVA |
| Total | 800 | 800 | 800 | 800 |
| % VLDPE BY WEIGHT | 26.0% | 35.7% | 22.1% | 32.0% |
| FILM THICKNESS | 78 | 83 | 86 | 75 |
| | 1 | 2 | 3 | |
| INNER LAYER (1) | 55 ATTANE 4003 | 55 ATTANE 4003 | 55 ATTANE 4003 | |
| LAYER (2) (18% vinyl acetate EVA unless 28% stated) | 380 | 380 | 380 | |
| OPTIONAL | 100 MA | 100 MA | 100 MA | |

TABLE I-continued

FILM PRECURSOR LAYER THICKNESSES (Microns)

| | | | |
|---|---|---|---|
| BARRIER* (4) | | | |
| OUTER LAYER (3) The EVA is 12% vinyl acetate EVA | 190 50% ATTANE 4003 50% EVA | 190 ATTANE 4003 | 190 EVA |
| Total | 725 | 725 | 725 |
| % VLDPE BY WEIGHT | 18.3% | 29.6% | 6.6% |
| FILM THICKNESS | 77 | 76 | 76 |

*Some development structures have not included a barrier layer. A high abuse lamb bag may include a barrier structure.

To show the performance of these structures with a view to demonstrating their resistance to abuse reference should be made to FIG. 4. It can be seen that from these bag trial results the puncture energy is compared with the SL3 EVA film of W. R. Grace (NZ) Limited.

To indicate the puncture resistance of the structures a test was devised where a 5.8 mm spherical ball attached to a smaller diameter shaft was pushed at a speed of 30 mm/min through the film sample being held over a 15.5 mm hole in a smooth steel plate. The film sample being flat against the plate and a square section 40 by 40 mm rigidly fixed at the edges so the square section, hole, and shaft axis are concentric. The energy required to push the ball through the film was calculated using the compression energy method of Instron Model 4301 programme version 3.02, Dec. 18, 1986. This energy reading was averaged over several tests and is shown in Table II as Puncture Energy.

Methods used to measure Tensile Strength, Elongation and Free Shrink at 85° C. in Table II are ASTM D882-81, ASTM D882-81 and ASTM 2732-70 respectively.

The introduction of barrier layer (in cases 1 to 3 an MA layer) into the structure to give the film a substantially oxygen impermeability, changes the properties of the film (for example strength and puncture energy) so they cannot be directly compared with non barrier films. However the properties of strength and puncture resistance and other properties (for example shrink) provided by the various coextrusions and blends of VLDPE and EVA will be evident between films where the barrier layer has been introduced when comparing them with films which are essentially identical except that the barrier layer is omitted. Hence the most preferred barrier film will comprise the same composition of resins as the most preferred non-barrier film (although layer gauges may be altered to maintain the desired final film thickness).

A full listing of important characteristics of films A through to S is described in Table 2.

TABLE II

| FORMULATIONS | GAUGE (Micron) | TENSILE STRENGTH (kg/cm²) | | ELON- GATION (%) | | SHRINK (%) | | PUNCTURE ENERGY (kg · cm) |
|---|---|---|---|---|---|---|---|---|
| | | LD | TD | LD | TD | LD | T | |
| A | 78 | 600 | 537 | 347 | 196 | 36 | 45 | 6.5 |
| B | 80 | 632 | 607 | 328 | 257 | 35 | 45 | 5.8 |
| C | 77 | 559 | 456 | 285 | 163 | 41 | 47 | 4.2 |
| D | 74 | 593 | 524 | 298 | 168 | 40 | 45 | 4.6 |
| E | 78 | 656 | 512 | 299 | 173 | 40 | 52 | 6.2 |
| F | 83 | 631 | 536 | 330 | 166 | 35 | 45 | 7.4 |
| G | 86 | 537 | 393 | 281 | 132 | 37 | 48 | 4.5 |
| H | 75 | 676 | 579 | 277 | 189 | 39 | 49 | 6.5 |
| SL$_3$ | 78 | 600 | 615 | 271 | 187 | 48 | 59 | 4.1 |
| 1 | 77 | 474 | 332 | 238 | 170 | 41 | 48 | 3.4 |
| 2 | 76 | 520 | 573 | 251 | 165 | 40 | 50 | 5.2 |
| 3 | 76 | 446 | 335 | 194 | 173 | 43 | 51 | 3.1 |

Another factor to be taken into account in choosing that formulation most likely to be useful in shrink wrapping meat cuts or the like is the degree of shrinkage upon the application of moderate heat. Of the formulations shown, those indicated as E and F combine the best puncture energy requirements with no substantial loss in shrinkage. Indeed, most of the formulations of the table would still be termed as being high shrink. Indeed, all would have a shrinkage of only 5% to 15% less than that of the E900 SL3 bag of W. R. Grace (NZ) Limited or the SURLYN bag of Trigon Packaging Systems (NZ) Limited.

Clearly, the various gauges in microns expressed in the table are not critical but it is interesting to note that the inner layer 1 is thinner than the other layers in the preferred forms and preferably in each instance the thickest layer is that layer designated as 2, although the abuse resisting outer layer 3 is preferably almost as thick and certainly preferably much thicker than the produce contacting inner layer 1. A suggested thickness for any optional barrier layer of PVdC (preferably SARAN from the Dow Chemical Company) is within the range of from 4–9 microns.

The present invention has provided multi-layer films having a VLDPE presence in both outer layers, and in so doing provides a multi-layer film having increased abuse resistance without a substantial detraction from the shrink wrapping performance normally associated with the use of EVA. Films in accordance with the present invention are capable of being formed by co-extrusion or extrusion coating and can then be formed by heat sealing into any particular container configuration including bags.

The attention of the reader is drawn to the applicant's co-pending application, entitled "Improvements In And/Or Relating to Multi Layer Films", the contents of which are incorporated herein by reference.

What is claimed is:

1. A multilayer heat shrinkable film having a measure of abuse resistance greater than that of ethylene vinyl acetate copolymer and a shrinkability greater than that of very low density polyethylene, said film comprising:
   a food contacting layer selected from the group consisting of very low density polyethylene and blends of very low density polyethylene and ethylene vinyl acetate copolymer;
   an internal layer comprising at least about 50% by weight of ethylene vinyl acetate copolymer; and
   an outside abuse layer comprising a blend of very low density polyethylene and ethylene vinyl acetate copolymer.

2. A film as in claim 1 wherein the internal layer consists essentially of ethylene vinyl acetate copolymer.

3. A film as in claim 1 wherein there is included at least barrier layer.

4. A film as claimed in claim 3 wherein said barrier layer is vinylidene chloride vinyl chloride copolymer, vinylidene chloride methyl acrylate copolymer, or blends thereof.

5. A film as claimed in claim 1 wherein said outside abuse layer is a blend in the range of from about 25% to 75% by weight of ethylene vinyl acetate copolymer and from about 75% to 25% by weight of very low density polyethylene.

6. A film as in claim 1 wherein the food contacting layer consists essentially of very low density polyethylene.

7. A film as in claim 1 wherein the food contacting layer comprises a blend of very low density polyethylene and ethylene vinyl acetate copolymer.

8. A film of claim 7 wherein said food contacting layer comprises about 50% by weight very low density polyethylene and about 50% by weight ethylene vinyl acetate copolymer.

9. A film of claim 1 wherein there are four layers including an internal barrier layer.

10. A film of claim 1 wherein said very low density polyethylene has a density below about 0.915 grams/cc.

11. A container or packaging wherein at least part thereof is a multilayer heat shrinakble film in accordance with claim 1 and wherein the outside abuse layer is a blend of from about 25% to 75% by weight ethylene vinyl acetate copolymer and from about 75% to 25% by weight very low density polyethylene.

12. A film of claim 1 wherein the food contacting layer and a contiguous internal layer of ethylene vinyl acetate copolymer has been irradiated while the remaining layers have not.

* * * * *